(12) United States Patent
Gotoda et al.

(10) Patent No.: US 11,511,747 B2
(45) Date of Patent: Nov. 29, 2022

(54) CONTROL DEVICE, SCANNING SYSTEM, CONTROL METHOD, AND PROGRAM

(71) Applicant: PIONEER CORPORATION, Tokyo (JP)

(72) Inventors: Akira Gotoda, Kawagoe (JP); Makoto Kurahashi, Kawagoe (JP); Hiroshi Nagata, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 281 days.

(21) Appl. No.: 16/614,740

(22) PCT Filed: May 18, 2018

(86) PCT No.: PCT/JP2018/019378
§ 371 (c)(1),
(2) Date: Nov. 18, 2019

(87) PCT Pub. No.: WO2018/212346
PCT Pub. Date: Nov. 22, 2018

(65) Prior Publication Data
US 2020/0086871 A1    Mar. 19, 2020

(30) Foreign Application Priority Data
May 18, 2017  (JP) .............................. JP2017-099151

(51) Int. Cl.
*B60W 30/18*    (2012.01)
*G05D 1/00*    (2006.01)
(Continued)

(52) U.S. Cl.
CPC ........... *B60W 30/18* (2013.01); *G05D 1/0088* (2013.01); *B60W 2554/00* (2020.02);
(Continued)

(58) Field of Classification Search
CPC ............. B60W 30/18; B60W 2554/00; B60W 2555/60; G05D 1/0088; G01S 17/931; G01S 7/497
See application file for complete search history.

(56) References Cited

U.S. PATENT DOCUMENTS 5,672,817 A * 9/1997 Sagisaka ............. F02D 41/1495
                                                        73/23.32
6,061,015 A * 5/2000 Sugimoto ............. G01S 13/931
                                                        342/52
(Continued)

FOREIGN PATENT DOCUMENTS

DE    19832800 A1    2/1999
DE    10055457 A1    7/2001
(Continued)

OTHER PUBLICATIONS

S. Diggins et al., "Range-Finding Sensor Degradation in Gamma Radiation Environments" IEEE Sensors Journal, vol. 15, No. 3, Mar. 2015. pp. 1864-1871 (Year: 2015).*
(Continued)

*Primary Examiner* — Peter D Nolan
*Assistant Examiner* — Tanya C Sienko
(74) *Attorney, Agent, or Firm* — Procopio, Cory, Hargreaves & Savitch LLP

(57) ABSTRACT

A control device (100) can communicate with a first sensor (300) for detecting an object around a first vehicle and is equipped on the first vehicle (500). The control device (100) includes a first acquisition unit, a second acquisition unit, a detection unit, and a determination unit. The first acquisition unit acquires a sensing result being a result of detecting an object around the first vehicle (500) from the first sensor (300) equipped on the first vehicle (500). The second acquisition unit acquires positional information of a specified object being an object for performance measurement of
(Continued)

the first sensor (300). The detection unit detects the specified object existing within a reference distance from the first vehicle (500), by use of positional information of the first vehicle (500) and positional information of the specified object. The determination unit determines performance of the first sensor (300), based on the sensing result of the specified object by the first sensor (300).

20 Claims, 12 Drawing Sheets

(51) Int. Cl.
*G01S 17/931* (2020.01)
*G01S 7/497* (2006.01)

(52) U.S. Cl.
CPC .......... *B60W 2555/60* (2020.02); *G01S 7/497* (2013.01); *G01S 17/931* (2020.01)

(56) References Cited

U.S. PATENT DOCUMENTS

| | | | | |
|---|---|---|---|---|
| 6,147,637 | A * | 11/2000 | Morikawa | G01S 7/4004 356/28 |
| 6,445,335 | B1 * | 9/2002 | Tamatsu | G01S 7/4056 342/72 |
| 9,274,213 | B2 * | 3/2016 | Hegemann | G01S 7/40 |
| 9,274,525 | B1 * | 3/2016 | Ferguson | B60W 50/0205 |
| 9,659,378 | B2 * | 5/2017 | Sasaki | G06T 7/246 |
| 2016/0063717 | A1 * | 3/2016 | Sasaki | G01S 7/4972 345/419 |
| 2016/0161602 | A1 * | 6/2016 | Prokhorov | G01S 7/4026 702/97 |
| 2018/0025961 | A1 * | 1/2018 | Momose | H01L 23/28 257/713 |

FOREIGN PATENT DOCUMENTS

| | | |
|---|---|---|
| DE | 102015206605 A1 | 10/2016 |
| JP | H11-094946 A | 4/1999 |
| JP | H11-202049 A | 7/1999 |
| JP | 2001-141804 A | 5/2001 |
| JP | 2005-134231 A | 5/2005 |
| JP | 2007-178310 A | 7/2007 |
| JP | 2015-230552 A | 12/2015 |
| JP | 2016-035423 A | 3/2016 |
| JP | 2016-045150 A | 4/2016 |
| JP | 2016-162204 A | 9/2016 |
| JP | 2017-072422 A | 4/2017 |
| JP | 2018-048896 A | 3/2018 |
| WO | 2017/057042 A1 | 4/2017 |

OTHER PUBLICATIONS

International Search Report for related International Application No. PCT/JP2018/019378, dated Aug. 21, 2018; 2 pages.
Extended European Search Report for related EP App. No. 18802676.9 dated Jan. 27, 2021; 8 pages.

* cited by examiner

FIG. 5

| SPECIFIED OBJECT ID | REFERENCE PERFORMANCE DATA |
|---|---|
| 001 | F(x) |
| 002 | G(x) |
| ⋮ | ⋮ |

FIG. 6

| INCLINATION | CORRECTION DATA |
|---|---|
| 5 DEGREES | XX[dB] |
| 10 DEGREES | YY[dB] |
| ⋮ | ⋮ |

FIG. 9

| SPECIFIED OBJECT ID | HISTORY DATA | | | |
|---|---|---|---|---|
| | SENSOR ID | SENSING RESULT | DEGRADATION STATE | TIME INFORMATION |
| 001 | S001 | XXX | AMOUNT OF DEGRADATION: D1 | YYYY/MM/DD hh:mm:ss |
| | S002 | YYY | NO DEGRADATION | YYYY/MM/DD hh:mm:ss |
| | ⋮ | ⋮ | ⋮ | ⋮ |
| ⋮ | | | | |

FIG. 12

| SPECIFIED OBJECT ID | HISTORY DATA | | | | |
|---|---|---|---|---|---|
| | SENSOR ID | SENSING RESULT (SIGNAL-TO-NOISE RATIO OR SIGNAL STRENGTH) | DISTANCE TO SPECIFIED OBJECT | DIRECTION OF SPECIFIED OBJECT | VEHICLE SPEED |
| 001 | S001 | XXX | x[m] | θ1 | v1[km/h] |
| | S002 | YYY | y[m] | θ2 | v2[km/h] |
| | ... | ... | ... | ... | ... |
| ... | | | | | |

CONTROL DEVICE, SCANNING SYSTEM, CONTROL METHOD, AND PROGRAM

CROSS-REFERENCE TO RELATED APPLICATIONS

This application is a U.S. National Stage entry of PCT Application No: PCT/JP2018/019378 filed May 18, 2018, which claims priority to Japanese Patent Application No. 2017-099151, filed May 18, 2017, the contents of which are incorporated herein by reference.

TECHNICAL FIELD

The present invention relates to a control device, a scanning system, a control method, and a program.

BACKGROUND ART

Research and development of a so-called automated driving technology of automatically controlling a behavior of a vehicle by use of an output from various sensors equipped on the vehicle are under way.

Patent Document 1 mentioned below discloses an example of a technology related to the automated driving technology. Patent Document 1 mentioned below discloses a technology of determining a risk, based on a detection result of a sensor used for control of autonomous driving, and outputting information for causing a driver to terminate autonomous driving, based on the determined risk.

RELATED DOCUMENT

Patent Document

[Patent Document 1] Japanese Unexamined Patent application Publication No. 2015-230552

SUMMARY OF THE INVENTION

Technical Problem

Sensing performance of a sensor may be degraded due to aging or some malfunction. The aforementioned technology in Patent Document 1 assumes that sensing by a sensor is performed accurately and does not provide a solution to such a problem.

The present invention has been made in view of the aforementioned problem, and an object of the present invention is to provide a technology of grasping a state of a sensor equipped on a vehicle.

Solution to Problem

The invention according to claim 1 is a control device including:

a first acquisition unit configured to acquire a sensing result being a result of detecting an object proximate to a first vehicle from a first sensor equipped on the first vehicle;

a second acquisition unit configured to acquire positional information of a specified object being any one of multiple objects detectable by the first sensor;

a detection unit configured to detect the specified object existing within a reference distance from the first vehicle, by use of positional information of the first vehicle and positional information of the specified object; and a determination unit configured to determine performance of the first sensor by use of the sensing result of the specified object by the first sensor.

The invention according to claim 16 is a scanning system including:

the control device according to any one of claims 1 to 15; and a sensor configured to detect an object positioned proximate to the first vehicle.

The invention according to claim 18 is a control method executed by a computer, the control method including:

acquiring a sensing result being a result of detecting an object proximate to a first vehicle from a first sensor equipped on the first vehicle;

acquiring positional information of a specified object being any one of multiple objects detectable by the first sensor;

detecting the specified object existing within a reference distance from the first vehicle, by use of positional information of the first vehicle and positional information of the specified object; and determining performance of the first sensor by use of the sensing result of the specified object by the first sensor.

The invention according to claim 19 is a non-transitory computer readable medium storing a program for causing a computer to function as:

a unit configured to acquire a sensing result being a result of detecting an object proximate to a first vehicle from a first sensor equipped on the first vehicle;

a unit configured to acquire positional information of a specified object being any one of multiple objects detectable by the first sensor;

a unit configured to detect the specified object existing within a reference distance from the first vehicle, by use of positional information of the first vehicle and positional information of the specified object; and a unit configured to determine performance of the first sensor by use of the sensing result of the specified object by the first sensor.

BRIEF DESCRIPTION OF THE DRAWINGS

The aforementioned object, other objects, features and advantages will become more apparent by the following preferred embodiments and accompanying drawings.

FIG. 5 is a diagram illustrating an example of a storage unit storing reference performance data.

FIG. 6 is a diagram illustrating an example of a table defining a correspondence relation between an inclination and correction data.

FIG. 9 is a diagram illustrating an example of a table storing a sensing result of each vehicle as a history.

FIG. 12 is a diagram illustrating an example of history data (reference performance data).

DESCRIPTION OF EMBODIMENTS

Embodiments of the present invention will be described below by use of drawings. In every drawing, a similar reference sign is given to a similar component, and description thereof is appropriately omitted. Further, unless otherwise described, each block in a block diagram represents a function-based configuration rather than a hardware-based configuration.

Description of Outline

Figure 1:
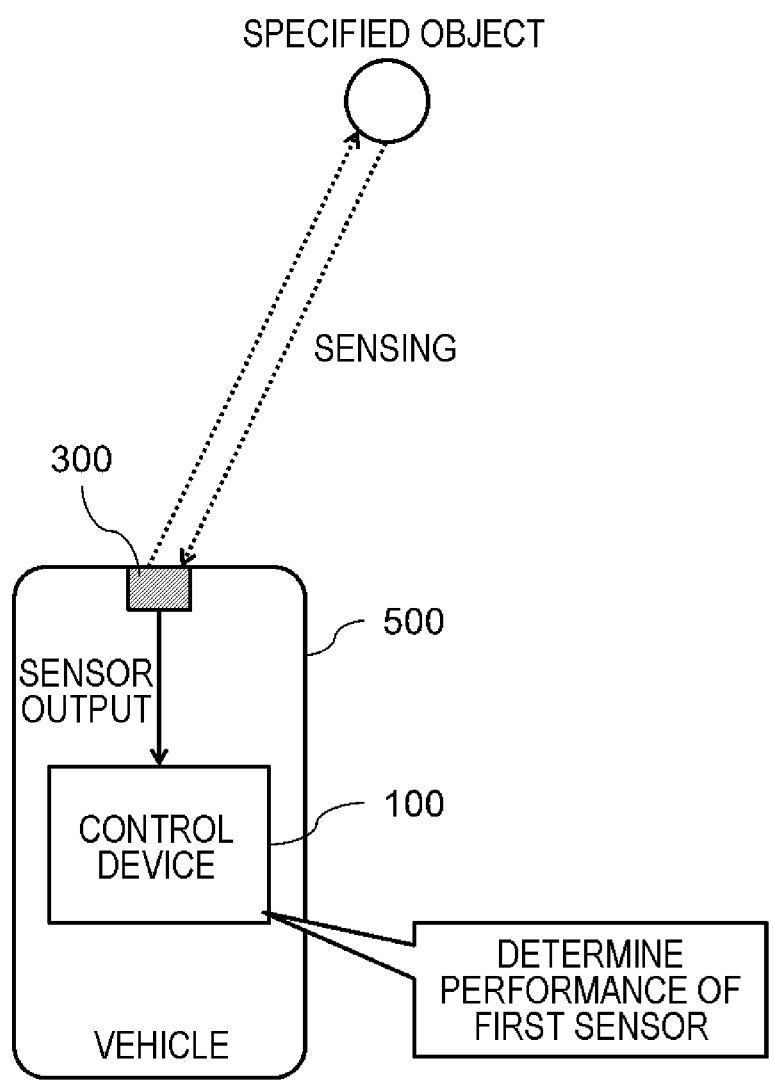
FIG. 1 is a diagram for illustrating an outline of a control device according to the present invention.

FIG. 1 is a diagram for illustrating an outline of a control device 100 according to the present invention. The control device 100 according to the present invention may be a device equipped on a vehicle 500 (may be hereinafter also denoted as a "first vehicle 500") or may be an external device communicably connected to the first vehicle 500 through a communication network outside the vehicle. Further, part of functions of the control device 100, to be described below, may be provided by a device equipped on the first vehicle 500, and the remaining functions may be provided by an external device. An example of the control device 100 being equipped on the first vehicle 500 is illustrated in FIG. 1. Further, the control device 100 is also communicably connected to a sensor 300 (may be hereinafter also denoted as a "first sensor 300") equipped on the first vehicle 500. The first sensor 300 includes various sensors for detecting an object positioned proximate to the first vehicle 500. A sensing result of an object by the first sensor 300 may be used as an input to a known algorithm for detecting surrounding obstacles or a known algorithm for estimating a self-position and an attitude of the first vehicle 500, in addition to being used for performance measurement of the sensor, to be described later. Sensing performance of the first sensor 300 may be degraded due to a state of the sensor such as aging degradation and internal temperature of the sensor, or an external environment (such as rain, fog, a cloud of dust, snow, or the westering sun). Further, degradation in sensing performance of the first sensor 300 appears in a form of a variation in a characteristic (such as a signal-to-noise ratio or a signal strength) of the sensing result. The control device 100 according to the present invention at least has a function of determining performance of the first sensor 300, based on a characteristic of the sensing result of an object used for measuring the performance of the first sensor 300 (may be hereinafter also denoted as a "specified object").

A specific configuration and a specific operation of the control device 100 will be described in each the following embodiments.

First Embodiment

Functional Configuration

Figure 2:
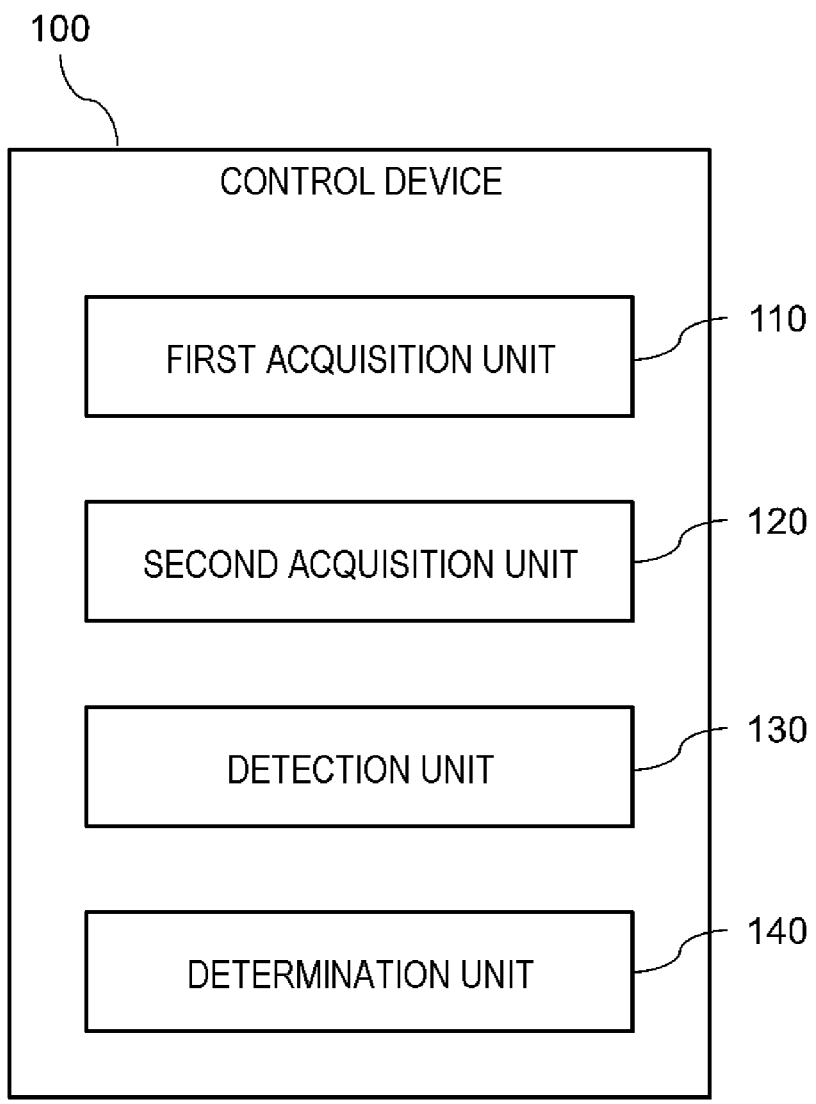
FIG. 2 is a block diagram conceptually illustrating a functional configuration of a control device according to a first embodiment.

FIG. 2 is a block diagram conceptually illustrating a functional configuration of a control device 100 according to a first embodiment. As illustrated in FIG. 2, the control device 100 according to the present embodiment includes a first acquisition unit 110, a second acquisition unit 120, a detection unit 130, and a determination unit 140.

The first acquisition unit 110 acquires a sensing result of an object from a first sensor 300 for detecting an object proximate to a first vehicle 500. Further, the second acquisition unit 120 acquires positional information of a specified object. As described above, a specified object is an object used for performance measurement of the first sensor 300. A specified object may be a dedicated object provided for determining performance of a sensor equipped on each vehicle or may be a general object. In the case of the latter, for example, the specified object is an installation installed on the road (example: a signal, a delineator, a guardrail, a road sign, or a direction sign) or a marking on the road (a regulation marking or an instruction marking). An installation, and a marking on the road may also be used for estimation processing of a position and an attitude of each vehicle. The detection unit 130 detects a specified object existing within a reference distance from the first vehicle 500, by use of positional information of the first vehicle 500 and positional information of a specified object. The determination unit 140 determines performance of the first sensor 300 by a result of sensing of a specified object by the first sensor 300.

Hardware Configuration of Control Device 100

Each functional component in the control device 100 may be provided by hardware (example: a hardwired electronic circuit) providing each functional component or may be provided by a combination of hardware and software (example: a combination of an electronic circuit and a program controlling the electronic circuit). A case of each functional component in the control device 100 being provided by a combination of hardware and software will be further described.

Figure 3:
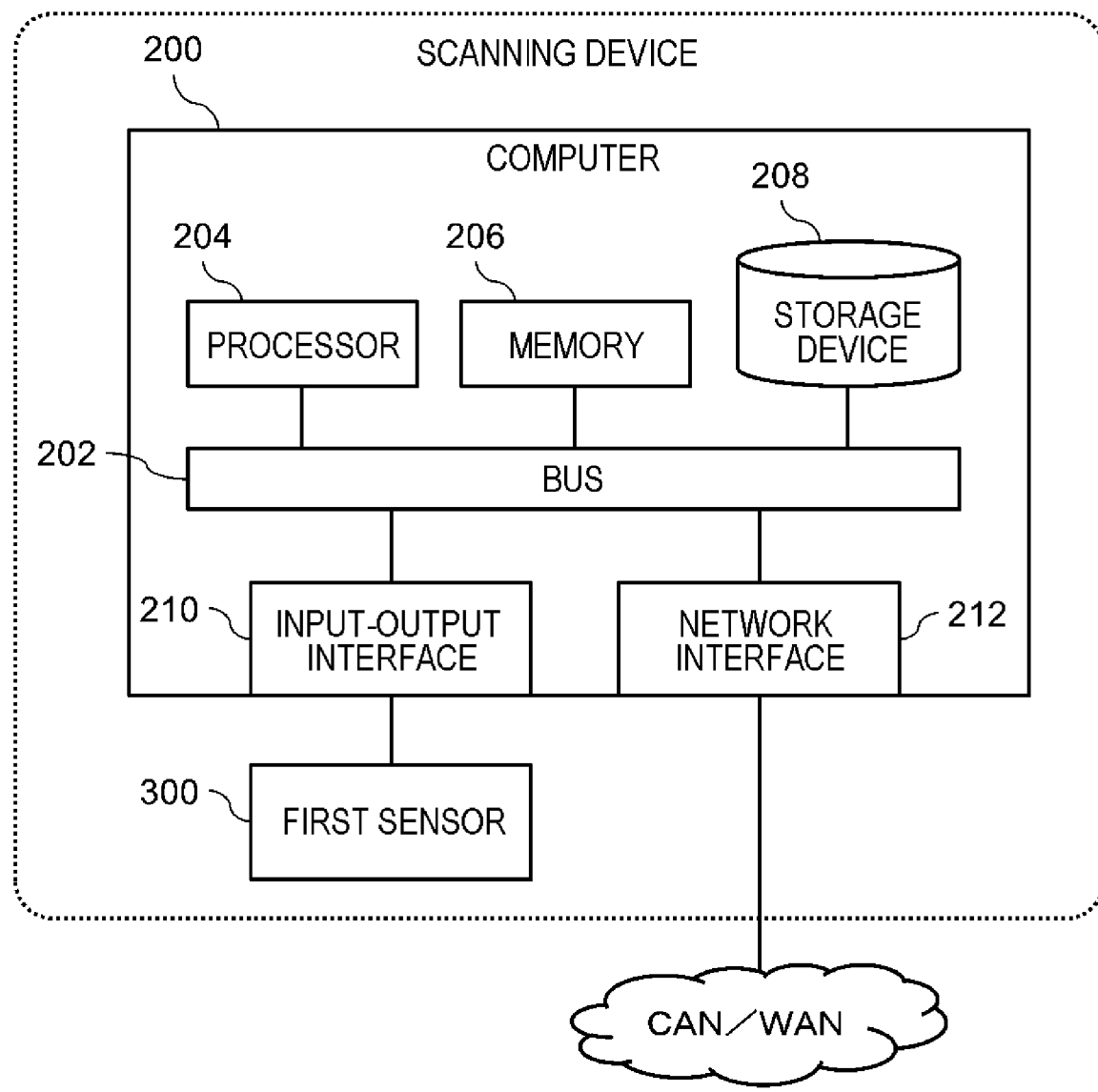
FIG. 3 is a diagram illustrating a hardware configuration of the control device.

FIG. 3 is a diagram illustrating a hardware configuration of the control device 100. A computer 200 is a computer containing the control device 100. When the control device 100 is an on-vehicle device, the computer 200 is, for example, an electronic control unit (ECU) equipped on the first vehicle 500. When the control device 100 is a server device positioned outside the vehicle, or the like, the computer 200 is constructed as a general computer. The computer 200 includes a bus 202, a processor 204, a memory 206, a storage device 208, an input-output interface 210, and a network interface 212. The bus 202 is a data transmission channel for the processor 204, the memory 206, the storage device 208, the input-output interface 210, and the network interface 212 to mutually transmit and receive data. However, the method of interconnecting the processor 204 and the like is not limited to the bus connection. The processor 204 is an arithmetic processing unit provided by use of a microprocessor, a central processing unit (CPU), a graphics processing unit (GPU), or the like. The memory 206 is a main storage unit provided by use of a random-access memory (RAM) or the like. The storage device 208 is an auxiliary storage unit provided by use of a read only memory (ROM), a flash memory, or the like. However, the storage device 208 may be configured with hardware similar to the hardware constituting the main storage unit, such as a RAM.

The storage device 208 stores a program module for providing each functional component in the control device 100. The processor 204 provides a function of the control device 100 by reading the program module into the memory 206 and executing the program module. The storage device 208 may store map information used by the detection unit 130.

The input-output interface 210 is an interface for connecting the computer 200 to peripheral equipment. In FIG. 3, the input-output interface 210 is connected to the first sensor 300 equipped on the first vehicle 500. The first sensor 300 is a sensor for detecting an object proximate to the first vehicle 500. For example, the first sensor 300 is an optical sensor measuring a distance and a direction from the first vehicle to an object by use of light (such as a pulse wave of light). Further, the first sensor 300 may be an image sensor using a charge-coupled device (CCD) or a complementary metal oxide semiconductor (CMOS), an acoustic sensor using a piezoelectric vibrator, or the like. Further, the present invention may be provided as a scanning system including the control device 100 and the first sensor 300. When the first sensor is a sensor using light, the scanning system may be referred to as a so-called light detection and ranging (Lidar) system.

The network interface 212 is an interface for connecting the computer 200 to a communication network. For example, the communication network is a Controller Area Network (CAN) or a Wide Area Network (WAN). A method of connecting the network interface 212 to the communication network may be a wireless connection or a wired connection. For example, the control device 100 can communicate with an ECU on the first vehicle 500 or an unillustrated server device through the network interface 212.

The configuration of the present embodiment described above allows determination of performance of the first sensor 300 equipped on the first vehicle 500. Further, the configuration of the present embodiment described above allows determination of performance of the first sensor 300 in real time while the first vehicle 500 is traveling.

Operation Example

Figure 4:
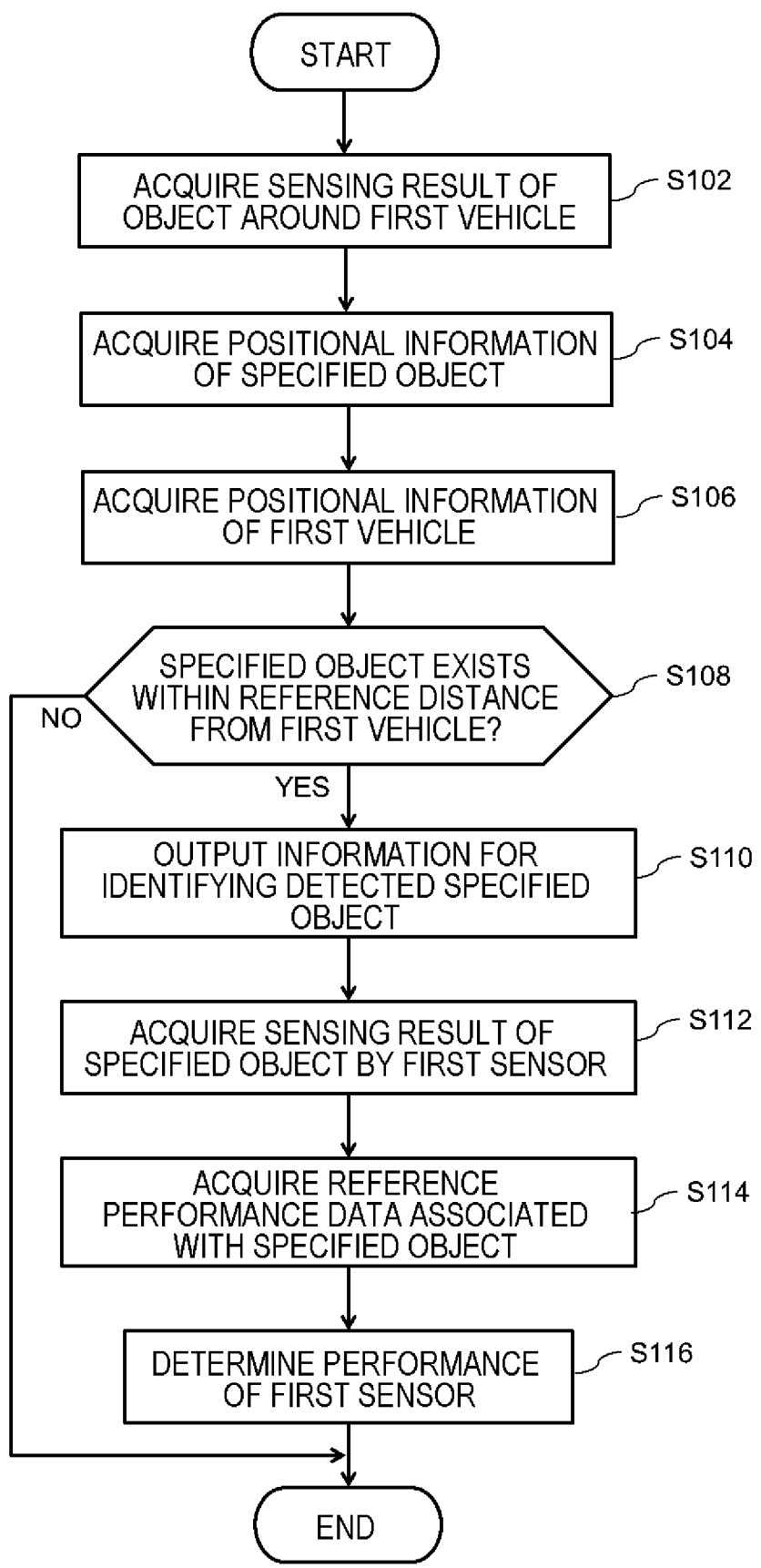
FIG. 4 is a flowchart illustrating an operation example of the control device according to the first embodiment.

The configuration of the first embodiment will be described below in more detail by giving a specific operation example. FIG. 4 is a flowchart illustrating an operation example of the control device 100 according to the first embodiment. For example, the process described below is repeatedly executed at predetermined intervals while the first vehicle 500 is traveling.

The first acquisition unit 110 acquires a result from the first sensor 300 (S102) detecting an object positioned proximate to the first vehicle 500. Next, the second acquisition unit 120 acquires positional information of a specified object (S104). For example, positional information of each specified object is stored in a predetermined table and is further stored in a predetermined storage unit. In addition, positional information of a specified object may be stored in association with map information. For example, by preparing, as a type of information included in map information about an object, flag information indicating whether or not the object is a specified object, or information allowing identification of a specified object (such as an identifier of the specified object), positional information of the specified object can be associated with the map information. Further, without being particularly limited, a specified object is a public property installed on a road (such as a signal, a delineator, a guardrail, a road sign, or a direction sign), a marking on a road (such as a regulation marking or an instruction marking), or the like. When the first sensor 300 uses light, a road sign or a direction sign using a retroreflective material is preferable as a specified object from a viewpoint of a capability of efficiently receiving reflected light.

The second acquisition unit 120 may acquire relative positional information between the first vehicle 500 (first sensor 300) and a specified object. For example, a specified object is installed at a position being a predetermined distance apart from a stop position of the first vehicle 500 in a factory performing maintenance of an accessory of the first vehicle 500, or the like, and the second acquisition unit 120 acquires information indicating the predetermined distance as "relative positional information between the first vehicle 500 (first sensor 300) and the specified object." In this case, reference performance (such as a signal-to-noise ratio or a signal strength) based on the predetermined distance is previously prepared in a predetermined storage area, and by comparison with reference performance read from the storage area, the determination unit 140 can evaluate performance of the first sensor 300. Further, the second acquisition unit 120 may acquire map information of the inside of the factory and positional information (or position-attitude information) of the specified object. In this case, for example, the map information of the inside of the factory and the positional information (or the position-attitude information) of the specified object are stored in a predetermined server device, and by communicating with the server device, the second acquisition unit 120 may acquire the aforementioned map information and the aforementioned positional information of the specified object or position-attitude information. The determination unit 140 can evaluate performance of the first sensor 300 by reading reference performance data to be compared from the predetermined storage area, based on the pieces of information described above and positional information of the own vehicle estimated in the factory, and comparing the reference performance data with an actual measurement result.

The detection unit 130 acquires positional information of the first vehicle 500 (S106). The detection unit 130 may be configured to be able to calculate positional information of the first vehicle 500 by use of a known algorithm estimating a self-position and an attitude, based on a Bayesian estimation, or may be configured to be able to acquire positional information of the first vehicle 500 generated by another unillustrated processing unit.

Then, based on positional information of the first vehicle 500 and positional information of each specified object, the detection unit 130 determines whether or not a specified object positioned within a reference distance from the first vehicle 500 exists (S108). When a specified object does not exist within the reference distance from the first vehicle 500 (S108: NO), subsequent processing is not executed. On the other hand, when a specified object exists within the reference distance from the first vehicle 500 (S108: YES), the detection unit 130 outputs information allowing identification of the specified object (such as an identifier uniquely assigned to each specified object) to the determination unit 140 (S110).

For example, information indicating a reference distance is previously stored in a storage unit such as the memory 206 or the storage device 208. Further, the detection unit 130 may be configured to change a reference distance according to a vehicle speed. As an example, the detection unit 130 can acquire a traveling speed of the first vehicle 500 through a CAN of the first vehicle 500, correct a reference distance stored in the storage unit, based on the traveling speed, and use the corrected reference distance. In this case, the detection unit 130 makes the correction in such a way that as the vehicle speed becomes faster, the reference distance becomes longer. Further, a plurality of reference distances maybe previously stored in a storage unit such as the memory 206 or the storage device 208, and the detection unit 130 may be configured to read a reference distance based on an acquired speed of the first vehicle 500. Thus, performance of the first sensor 300 can be determined within a distance based on a vehicle speed.

Out of the sensing results of objects positioned around the first vehicle 500, the sensing results being acquired in the processing in S102, the determination unit 140 acquires a sensing result of the specified object detected in the processing in S110 (S112). The determination unit 140 can calculate an estimated position of the specified object within a sensing range of the first sensor 300, based on information indicating a position and an attitude of the first vehicle 500 and map information, and can extract a signal in an area related to the specified object out of output signals of the first sensor 300, based on the estimated position. Further, after estimating an approximate area including the sensing result of the specified object in a sensing range of the first sensor 300 on the basis of information indicating the position and the attitude of the first vehicle 500 and the map information (the position of the specified object), the determination unit 140 can correct the estimated area, based on an actual sensing result. For example, the determination unit 140 can correct the roughly estimated area from spatial continuity between a detection distance or a signal strength expected for an output of the first sensor 300 with respect to the specified object, and the actual sensing result. The sensing result of the specified object by the first sensor 300 includes information indicating a distance from the first vehicle 500 to the specified object and information indicating a characteristic (for example, a signal-to-noise ratio or a signal strength) of the output signal of the first sensor 300. The sensing result of the specified object is acquired as information with respect to a plurality of points on a surface of the specified object. The determination unit 140 may use an average of sensing results of the plurality of points on the surface of the specified object as a sensing result of the specified object. Further, the determination unit 140 may select a sensing result at a distance closest to the reference distance out of the sensing results with respect to the plurality of points on the surface of the specified object and use the sensing result in performance determination processing of the first sensor 300, to be described later.

Then, the determination unit 140 acquires reference performance data associated with the specified object detected by the detection unit 130 (S114). For example, reference performance data related to each specified object is stored in association with information allowing identification of the specified object (such as an identifier of the specified object) as illustrated in FIG. 5. FIG. 5 is a diagram illustrating an example of a storage unit storing reference performance data. The determination unit 140 can read reference performance data, based on an identifier of a specified object acquired from the detection unit 130.

Reference performance data is data indicating a signal-to-noise ratio or a signal strength of an output signal of the first sensor 300 based on a distance to a specified object and is associated with each specified object in a form of a predetermined table or function. In the example in FIG. 5, reference performance data is associated in a format of a function. Reference performance data vary with a sensor equipped on a vehicle and therefore may be prepared for each sensor or each device equipped with the sensor. A case of using the same sensor is herein assumed for simplification of description.

The determination unit 140 can acquire distance reference performance data included in the sensing result acquired in the processing in S102. Depending on the type of the first sensor 300, the distance from the first vehicle 500 to the specified object may not be included in the sensing result. For example, when the first sensor 300 is a common monocular camera, the sensing result (image data) may not include information on the distance to the specified object. In such a case, the determination unit 140 can calculate a difference distance between the positional information of the specified object acquired in the processing in S104 and the positional information of the first vehicle 500 acquired in the processing in S106, and acquire reference performance data based on the difference distance. Further, based on the size of the specified object on the image data (a relative size with respect to a width and a height of the image data), the determination unit 140 may estimate a distance from the first sensor 300 to the specified object and use the estimated distance as a distance from the first vehicle 500 to the specified object.

For example, the reference performance data is data based on a sensing result of a specified object by the first sensor 300 in a predetermined external environment (test environment). As an example, the reference performance data is test-measurement data of a specified object by the first sensor 300 in an ideal state. The ideal state refers to a state in which an effect of an external environment (such as an effect of external light [the setting sun], rain, fog, a cloud of dust, or snow) on performance of the first sensor 300 does not exist, and also aging degradation of the sensor does not exist (for example, the state at initial shipping). The reference performance data may be determined based on a single test result or may be determined based on a statistical data (such as a maximum value, a median, a mode, or an average) of a plurality of test measurement results. Further, a plurality of types of reference performance data may be prepared by performing measurements in various test environments with different conditions. For example, a plurality of types of reference performance data such as first reference data acquired by a test measurement in the ideal state, second reference performance data acquired by a test measurement in a darkroom, third reference performance data acquired by a test measurement in an environment assuming nighttime, and fourth reference performance data in an environment assuming cloudiness in the daytime may be prepared. Further, the reference performance data may be determined based on a performance value theoretically derived from the product specification of the first sensor 300.

Further, without being limited to the example in FIG. 5, when information indicating a physical characteristic of each individually specified object (such as a light reflectance) is kept in association with map information or the like, the determination unit 140 may also calculate the reference performance data by use of the information indicating a physical characteristic of each individually specified object. In this case, a function or a table for calculating reference performance data by use of information indicating a physical characteristic of a specified object is previously prepared in the memory 206 or the storage device 208. By using information indicating a physical characteristic associated with a specified object detected by the detection unit 130 as an input to the function or the table, the determination unit 140 can derive reference performance data of the specified object. Thus, even for the same type of specified objects, a physical characteristic is kept for each individual, and therefore degradation or the like of a specified object can be handled.

Then, the determination unit 140 determines performance of the first sensor 300, based on a result of comparing an actual sensing result of the specified object acquired in the processing in S112 with reference performance data associated with the specified object acquired in the processing in S114 (S116). The determination unit 140 can determine an estimated value (such as a decibel value or a ratio) of performance of the first sensor 300, on the basis of a signal-to-noise ratio or a signal strength based on a distance to the specified object, the ratio or the strength being indicated by the reference performance data, and output information indicating the determination result. Specifically, the determination unit 140 can output information indicating "N [dB] degradation with respect to the reference performance."

First Modified Example

For example, each specified object may become unsuited for performance measurement of the first sensor 300 due to a state (such as adhesion of dirt, deformation, or degradation of the surface) of the specified object or a surrounding environment. The detection unit 130 may have a function of excluding such a specified object unsuited for performance measurement of the first sensor 300 from a detection target.

As an example, the detection unit 130 may exclude a specified object not satisfying a predetermined criterion from a detection target by use of history data of a sensing result of the specified object. For example, the predetermined criterion is "a probability of acquiring a sensing result equivalent (for example, 90% or greater) to a signal-to-noise ratio or a signal strength indicated by reference performance data associated with the specified object is less than or equal to a certain ratio (for example, 30%)." By excluding such a specified object from a detection target, the detection unit 130 can improve performance measurement precision of the first sensor 300.

When the control device 100 is an on-vehicle device, history data of a sensing result of a specified object is kept in, for example, a server device (unillustrated) on an external network. Further, when the control device 100 is an external server device, history data of a sensing result of a specified object is kept in the memory 206 or the storage device 208 in the computer 200 providing the control device 100. When a sensor equipped on each vehicle performs sensing on a specified object, the sensing result (a distance to the specified object and a signal-to-noise ratio or a signal strength of a signal) is sent to the server device along with identification information of the specified object.

By accumulating a sensing result of a specified object by a sensor, equipped on each vehicle by the control device 100 and functioning as a server device or a server device on an external network, history data of the sensing result of the specified object is generated and updated. Further, information indicating a time and the weather when sensing is performed on the specified object and information for identifying the sensor may be further transmitted to the control device 100 functioning as a server device or the server device on the external network.

In this case, the detection unit 130 can narrow down the history data by conditions such as the weather or a time, and precisely determine whether or not the specified object is suited for performance measurement of the first sensor 300. Further, information indicating a degradation state of the sensor performing the sensing may be further transmitted to the control device 100 functioning as a server device or the server device on the external network. The detection unit 130 may exclude data related to a degraded sensor, based on the information indicating a degradation state of the sensor. Thus, by excluding data in which a cause of a sensing result equivalent to reference performance data not being acquired includes degradation of a sensor, whether or not a specified object is suited for performance measurement of the first sensor 300 can be more precisely determined.

Further, as another example, the detection unit 130 can sort out a specified object to be a detection target, by use of information indicating a tilt of a specified object. Specifically, the detection unit 130 can sort out a specified object to be a detection target, based on a tilt of a specified object relative to the first vehicle 500 or a road on which the first vehicle 500 is traveling. For example, the detection unit 130 can identify a current attitude of the first vehicle 500 (a direction the first vehicle 500 is pointed towards) by use of the first sensor 300 or another inertial measurement device, and calculate a degree of tilt of the specified object relative to the first vehicle 500, based on information about the attitude of the first vehicle 500 and information indicating a direction of the specified object, the information about the direction being stored in map information.

This method allows more accurate calculation of a degree of tilt of a specified object relative to the first vehicle 500 and therefore is effective in terms of precision enhancement. In addition, the detection unit 130 may assume the extended direction of a road on which the first vehicle 500 is currently traveling as being the attitude of the first vehicle 500 and simply calculate a degree of tilt of a specified object relative to the road as the degree of tilt of the specified object relative to the first vehicle 500. In this case, the detection unit 130 can determine the extended direction of the road on which the first vehicle 500 is currently traveling, based on information indicating the current position of the first vehicle 500 and information about roads stored in the map information. This method is more advantageous than the former method in being able to be implemented by simpler processing.

Further, the detection unit 130 may switch these methods, depending on location or situation. For example, the detection unit 130 may be configured to switch to the method of calculating a degree of tilt of a specified object assuming the extended direction of a road as an attitude of the first vehicle 500 when a degree of likelihood of information about the attitude of the first vehicle 500 is lower than a predetermined reference. When a specified object is tilted, a sensor wave reflected and returned by the specified object cannot be efficiently received, and performance measurement precision of the first sensor 300 may be degraded. By excluding such a specified object from a detection target, the detection unit 130 can improve performance measurement precision of the first sensor 300.

Further, when a specified object is tilted relative to the first sensor 300, performance of the first sensor 300 may be affected depending on the degree of tilt. In this case, the determination unit 140 may further have the function of correcting a sensing result of the specified object according to the relative degree of tilt between the first sensor 300 and the specified object. Specifically, the determination unit 140 can read correction data based on the degree of tilt relative to the first sensor 300 by referring to an equation or a table (example: FIG. 6) indicating a correspondence relation between a degree of tilt relative to the first sensor 300 and correction data, and correct the sensing result by use of the correction data. FIG. 6 is a diagram illustrating an example of a table defining a correspondence relation between a tilt and correction data. A tilt in the table indicates a variation from an angle formed between a sensor and an object at the time of acquisition of reference performance data. With regard to a relative degree of tilt between the first sensor 300 and a specified object required in derivation of correction data from the table as illustrated in FIG. 6 or the like, for example, the determination unit 140 can calculate the relative degree of tilt between the first sensor 300 and the specified object, based on a position and a tilt of each specified object that are stored in the map information or the like, and a position and a tilt (attitude) of the own vehicle that may be calculated by use of a known algorithm. Further, when the first sensor 300 is a sensor capable of detecting a shape of a specified object, an attitude (degree of tilt) relative to the own vehicle may be estimated from a shape (attitude) of the specified object indicated by the sensing result.

Second Modified Example

Further, the determination unit 140 may determine performance of the first sensor 300 at a plurality of distances previously defined within a range of the aforementioned reference distance. For example, two distances $d_1$ and $d_2$ are previously defined within a range of a reference distance d (where $d_1 \le d$, $d_2 \le d$, and $d_1 \ne d_2$), and the determination unit 140 can determine performance of the first sensor 300, based on a sensing result at the first distance $d_1$ and a sensing result at the second distance $d_2$. For example, the determination unit 140 calculates a statistic (such as an average, a mode, or a median) of sensing results of a specified object at a plurality of distances. Thus, by using sensing results at a plurality of distances, performance determination precision of the first sensor 300 can be improved.

Second Embodiment

The present embodiment is similar to the first embodiment except for the following point.

Figure 7:
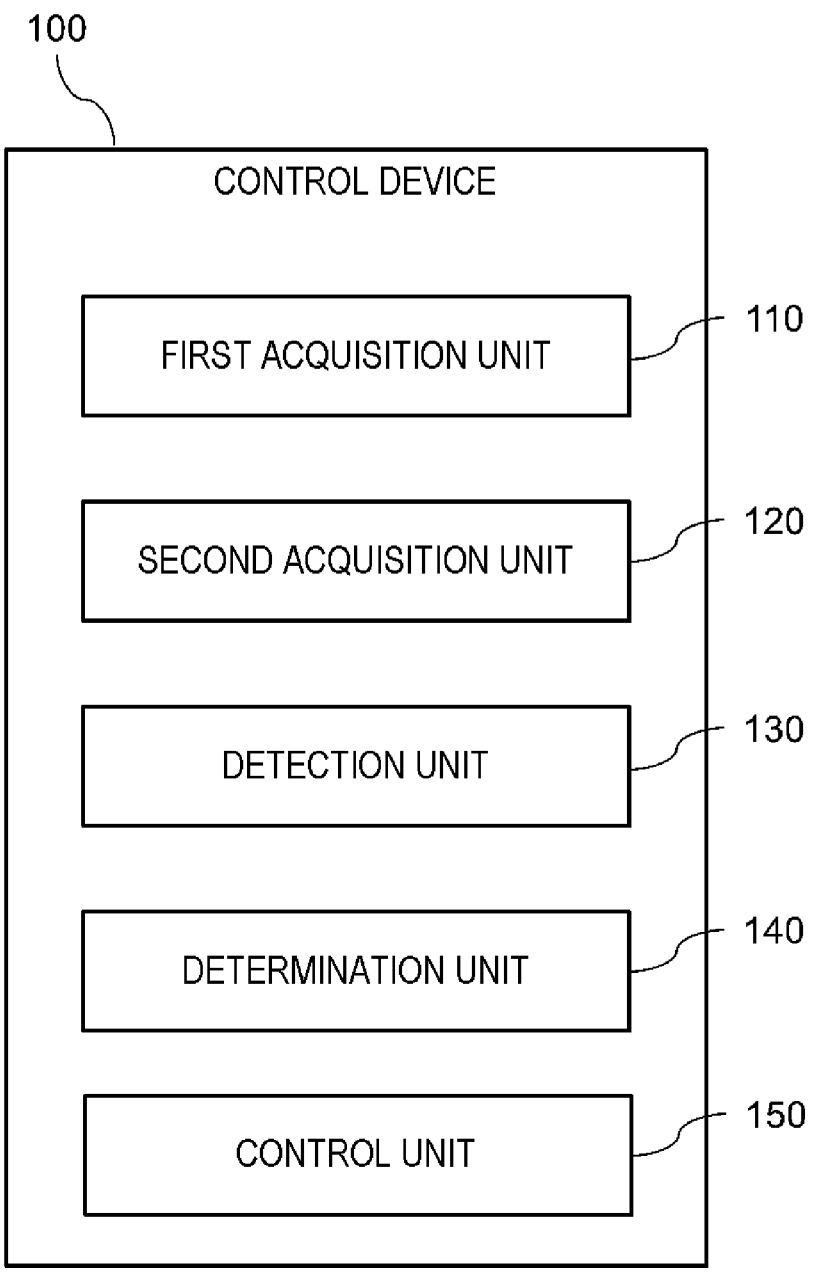
FIG. 7 is a block diagram conceptually illustrating a functional configuration of a control device according to a second embodiment.

FIG. 7 is a block diagram conceptually illustrating a functional configuration of a control device 100 according to the second embodiment. The control device 100 according to the present embodiment further includes a control unit 150 in addition to the configuration according to the first embodiment. The control unit 150 controls an operation of a first vehicle 500, based on performance of a first sensor 300 determined by a determination unit 140.

As an example, the control unit 150 can control a control parameter in automated driving of the first vehicle 500, by use of performance of the first sensor 300 determined by the determination unit 140. In this case, for example, the control unit 150 notifies an instruction related to a setting of a control parameter (such as a parameter value or an amount of parameter variation) based on a determination result of performance of the first sensor 300 to an ECU equipped on the first vehicle 500. The ECU on the first vehicle 500 controls the parameter in automated driving in accordance with the instruction from the control unit 150. As a specific example, the control unit 150 acquires an estimated value of performance of the first sensor 300 determined by the determination unit 140 and notifies the ECU of an instruction about an upper speed limit of the first vehicle 500 based on the estimated value. In this case, the ECU changes a control parameter for speed in accordance with the instruction. Further, as another example, when performance of the first sensor 300 determined by the determination unit 140 becomes less than or equal to a predetermined threshold value, the control unit 150 notifies the ECU of an instruction to gradually decelerate and stop the first vehicle 500. In this case, the ECU controls the first vehicle 500 in such a way that the first vehicle 500 gradually decelerates while pulling over to the side of a roadway, in accordance with the instruction. Further, as another example, when performance of the first sensor 300 determined by the determination unit 140 becomes less than or equal to a predetermined threshold value, the control unit 150 notifies the ECU of an instruction to switch over to manual driving. In this case, the ECU outputs a message about a switchover to manual driving, or the like from a display or a speaker device for a driver.

Hardware Configuration

The control device 100 according to the present embodiment includes a hardware configuration similar to the first embodiment (example: FIG. 3). A storage device 208 according to the present embodiment further stores a program module providing the function of the aforementioned determination unit 140, and the aforementioned function according to the present embodiment is provided by executing the program module by a processor 204.

As described above, the present embodiment allows control of the operation of the first vehicle 500, in accordance with a determination result of performance of the first sensor 300.

Third Embodiment

The present embodiment is similar to the respective aforementioned embodiments except for the following point. A configuration exemplified here is based on the configuration according to the first embodiment.

Functional Configuration

Figure 8:
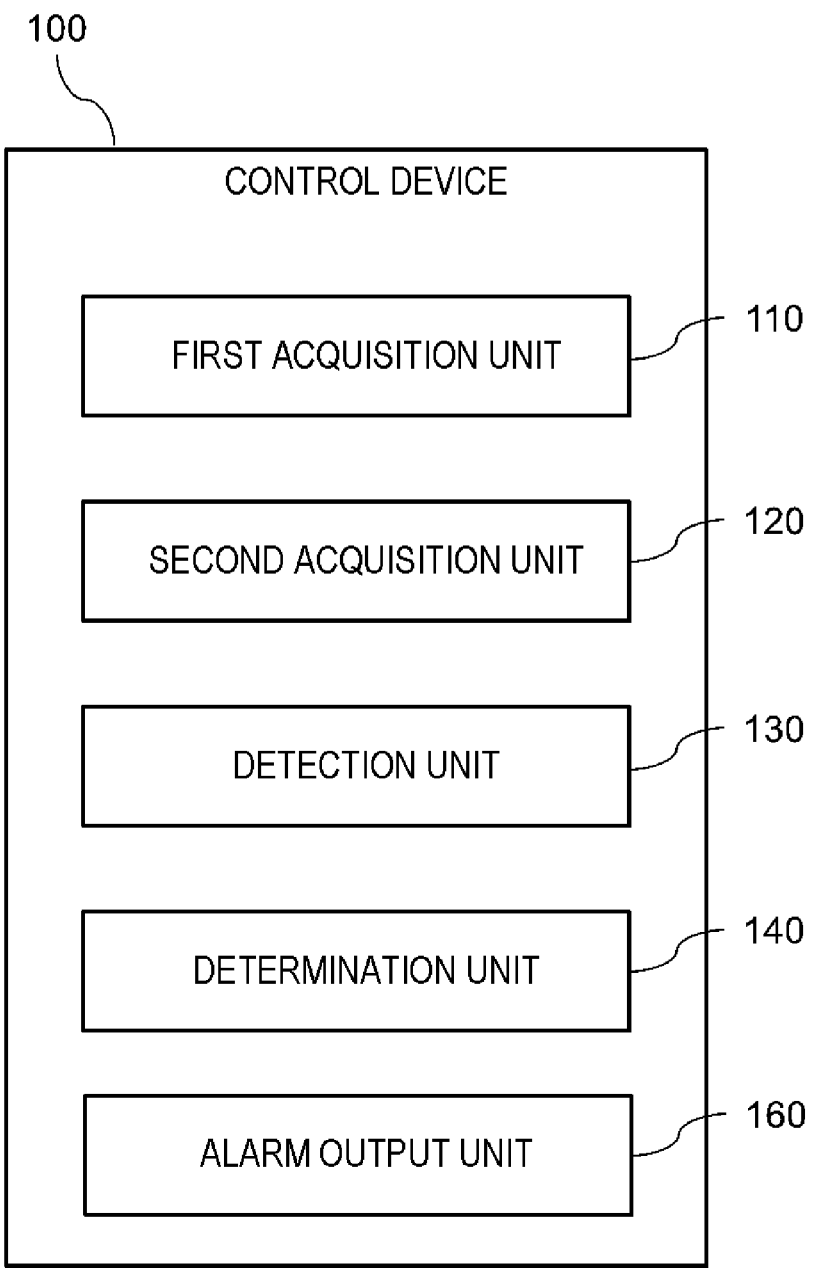
FIG. 8 is a block diagram conceptually illustrating a functional configuration of a control device according to a third embodiment.

FIG. 8 is a block diagram conceptually illustrating a functional configuration of a control device 100 according to the third embodiment. The control device 100 according to the present embodiment further includes an alarm output unit 160 in addition to the configuration according to the first embodiment.

A determination unit 140 according to the present embodiment estimates a degradation state of a first sensor 300 by use of a sensing result of a specified object by the first sensor 300 and additional information for performance comparison. Estimation processing of a degradation state by the determination unit 140 will be described below by giving several specific examples.

First Example

As an example, information about a vehicle different from a first vehicle 500 (may be hereinafter also denoted as a "second vehicle") on which a performance measurement of a sensor is made by use of the same specified object at almost the same time may be used as additional information for performance comparison. Specifically, the additional information for performance comparison is the result of sensing the same specified object by a sensor on the second vehicle (may be hereinafter also denoted as a "second sensor") and is information including a sensing result of which a difference in sensing time as compared with the first sensor 300 is within a predetermined threshold value and a degradation state of the second sensor.

When the control device 100 is an external server device, the determination unit 140 in the control device 100 collects a sensing result by a sensor equipped in each vehicle from each vehicle and for example, keeps the sensing result in a format as illustrated in FIG. 9. FIG. 9 is a diagram illustrating an example of a table storing a sensing result of each vehicle as a history. By referring to the table as illustrated in FIG. 9 by use of a time when the first sensor 300 performs sensing and an identifier of a specified object on which the first sensor 300 performs sensing, the determination unit 140 can specify data from a second sensor indicating the result of sensing the same specified object at almost the same time. Further, the determination unit 140 can acquire a degradation state of the second sensor tied to the specified data of the second sensor. When the control device 100 is an on-vehicle device, the determination unit 140 can acquire additional information as described above by performing vehicle-to-vehicle communication with an external server or a second vehicle traveling ahead of or behind the first vehicle 500. Further, when acquiring information from a second vehicle traveling ahead or behind by vehicle-to-vehicle communication, by transmitting a data transmission request including an identifier of a specified object to the second vehicle, the determination unit 140 can directly acquire data including a sensing result by the second sensor and a degradation state of the second sensor from the second vehicle.

A specific flow of estimating a degradation state of the first sensor 300 will be described below by use of the aforementioned additional information.

First, reference performance data associated with a specified object A is denoted as $R_A$, an effect of an external environment (for example, external light such as the sunlight, and obstacles such as rain, fog, and a cloud of dust) on sensing performance when the first sensor 300 performs sensing is denoted as $\alpha_1$, an effect of the external environment on sensing performance when the second sensor performs sensing is denoted as $\alpha_2$, a degradation state of the first sensor 300 is denoted as $\beta_1$, and a degradation state of the second sensor is denoted as $\beta_2$. Then, a sensing result $S_1$ of the specified object A by the first sensor 300 and a sensing result $S_2$ of the specified object A by the second sensor are expressed as the following equation (1) and equation (2), respectively.

Math. 1

$$S_1 = R_A - \alpha_1 - \beta_1 \qquad (1)$$

$$S_2 = R_A - \alpha_2 = \beta_2 \qquad (2)$$

The aforementioned equation (2) maybe transformed as expressed in the following equation (3). When the degradation state $\beta_2$ of the second sensor is acquired as known information along with the sensing result $S_2$ of the specified object by the second sensor, the left side part of the following equation (3) can be determined.

Math. 2

$$S_2 + \beta_2 = R_A - \alpha_2 \qquad (3)$$

Then, the following equation (4) may be derived based on the aforementioned equation (1) and equation (3).

Math. 3

$$(S_2 + \beta_2) - S_1 = (R_A - \alpha_2) - (R_A - \alpha_1 - \beta_1) = \beta_1 + \alpha_1 - \alpha_2 \qquad (4)$$

According to an assumption that "in order to measure performance of a sensor, the same specified object is used at almost the same time," magnitude of effects by the external environment may be considered almost equal. Specifically, the effect $\alpha_1$ of the external environment on performance when sensing is performed by the first sensor 300 and the effect $\alpha_2$ of the external environment on performance when sensing is performed by the second sensor become equal, and therefore "$\beta_1 + \alpha_1 - \alpha_2$" in the aforementioned equation (4) may be handled as "$\beta_1$."

Thus, the determination unit 140 can determine a degradation state of the first sensor by using, as information for comparison, data of the second vehicle (a sensing result of the same specified object by the second sensor and a degradation state of the second sensor) in which a performance measurement of the sensor is performed by use of the same specified object at almost the same time.

Second Example

Further, as another example, additional information including sensing results of one or more specified objects detected by the detection unit 130 after the first sensor 300 performs sensing on a specified object maybe used in addition to the additional information in the first example. With regard to the sensing results of one or more specified objects, the specified objects may be the same or different. For example, the determination unit 140 may estimate a degradation state of the first sensor 300 as described below.

First, the determination unit 140 assumes $\beta_1$ determined as described in the first example to be an amount of degradation of the first sensor 300. Then, the determination unit 140 compares a sensing result of each of one or more specified objects detected by the detection unit 130 within a predetermined period of time after $\beta_1$ is determined with reference performance data associated with each of the one or more specified objects. When a predetermined criterion (such as a ratio of a difference from the reference performance data being greater than or equal to $\beta_1$ is 70% or greater) is satisfied as a result of the comparison, the determination unit 140 sets $\beta_1$ as a proper amount of degradation of the first sensor 300.

The alarm output unit 160 determines a necessity for outputting an alarm about the first sensor 300, based on a degradation state of the first sensor 300 estimated by the determination unit 140 as described above. For example, when a degradation state (a degree of degradation) of the first sensor 300 is greater than or equal to a predetermined threshold value, the alarm output unit 160 generates an alarm for outputting a message prompting maintenance or replacement of the first sensor 300 from a display or a speaker.

Further, the alarm output unit 160 may be configured to determine the necessity for outputting the alarm, based on a comparison result between a degradation state (first degradation state) of the first sensor 300 estimated by the determination unit 140 at a certain timing and a degradation state (second degradation state) of the first sensor 300 estimated by the determination unit 140 prior to the certain timing. In this case, for example, when a difference between amounts of degradation is greater than or equal to a predetermined threshold value as a result of comparing the first degradation state with the second degradation state, the alarm output unit 160 determines that output of the alarm is necessary.

Hardware Configuration

The control device 100 according to the present embodiment includes a hardware configuration similar to that according to the first embodiment (example: FIG. 3). A storage device 208 according to the present embodiment further stores program modules providing the functions of the aforementioned determination unit 140 and the alarm output unit 160, respectively, and the aforementioned functions according to the present embodiment are provided by executing the respective program modules by the processor 204.

Operation Example

Figure 10:
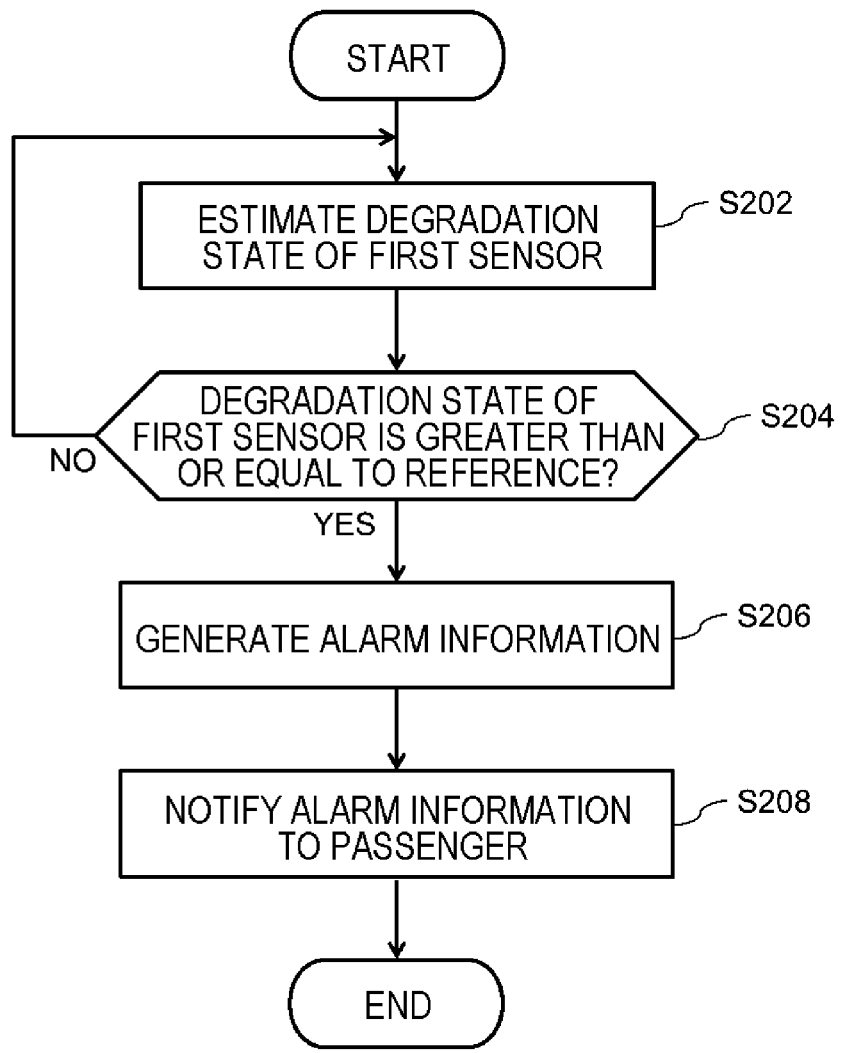
FIG. 10 is a flowchart illustrating an operation example of the control device according to the third embodiment.

An operation of outputting an alarm by the control device 100 according to the present embodiment will be described by use of FIG. 10. FIG. 10 is a flowchart illustrating an operation example of the control device 100 according to the third embodiment. For example, processing in FIG. 10 is executed after the processing in S116 in FIG. 4.

As described above, the determination unit 140 estimates a degradation state of the first sensor 300 (S202). The determination unit 140 notifies the estimated degradation state of the first sensor 300 to the alarm output unit 160.

Then, the alarm output unit 160 determines whether or not the degradation state of the first sensor 300 estimated in the processing in S202 is greater than or equal to a reference threshold value (S204). The reference threshold value used here is previously stored in a memory 206 or the storage device 208.

When the degradation state of the first sensor 300 is less than the reference threshold value (S204: NO), processing described below is not executed. On the other hand, when the degradation state of the first sensor 300 is greater than or equal to the reference threshold value (S204: YES), the alarm output unit 160 generates alarm information (S206). For example, the alarm information includes a message advising maintenance of the first sensor 300 or replacement of the first sensor 300. Then, the alarm output unit 160 outputs the alarm information through a display (for example, an unillustrated car navigation device or a meter panel) or a speaker device equipped on the first vehicle 500 and notifies the alarm information about the first sensor 300 to a passenger of the first vehicle 500 (S208).

As described above, the present embodiment allows estimation of a degradation state of the first sensor 300. Further, alarm information about the first sensor 300 is output to a passenger of the first vehicle 500, based on a degradation state of the first sensor 300. Consequently, a need for maintenance or replacement of the first sensor 300 can be informed to the passenger of the first vehicle 500.

Further, while an example of the alarm output unit 160 notifying alarm information to a passenger in the first vehicle 500 has been described, according to the aforementioned embodiment, without being limited to the above, for example, the alarm output unit 160 may be configured to notify alarm information to a center managing each vehicle. In addition, the alarm output unit 160 maybe configured to notify alarm information to a terminal (for example, a mobile terminal such as a smartphone or a tablet) used by a passenger of the first vehicle 500 (for example, a driver or a family of the driver). In this case, for example, address information of the terminal being a destination of the alarm is previously stored in the memory 206 or the storage device 208 through advance registration processing. In addition, the alarm output unit 160 may be configured to notify alarm information about the first sensor 300 to a control unit 150 or another ECU controlling an automated driving function, as a trigger or an instruction for changing a route in automated driving. In this case, for example, the control unit 150 or the ECU may select an automated driving route directed to a nearby repair shop in accordance with the notification of the alarm information from the alarm output unit 160.

While the embodiments have been described above with reference to the drawings, the embodiments are exemplifications of the present invention, and various configurations other than the above may be employed.

For example, since accuracy is more important than immediacy in terms of determination of aging degradation of a sensor, the determination unit 140 may be configured to determine a degradation state of the first sensor 300 by performing statistical processing on history data of sensing results of the first sensor 300.

As an example, the determination unit 140 may determine a statistic (such as a maximum value, a median, a mode, or an average) of differences between history data and reference performance data of sensing results in a predetermined period of time (or a predetermined number of times) as an amount of degradation of the first sensor 300.

Further, a sensor used for sensing normally has a temperature characteristic (output variation caused by temperature), and an output of the first sensor 300 may be affected by a temperature at the time of sensing. Consequently, when an abnormal (degraded from reference performance) sensing result is acquired as an output of the first sensor 300, a case that whether a cause of the abnormality is due to performance degradation of the first sensor 300 itself or the temperature when the first sensor 300 performs the sensing cannot be determined may be considered. Accordingly, the determination unit 140 may be configured to be able to sort out data used for statistical processing, by use of temperature information indicating a temperature of the first sensor 300. For example, when acquiring a sensing result from the first sensor 300, the determination unit 140 further acquires temperature information indicating a temperature of the first sensor 300 by, for example, a temperature sensor (unillustrated) built into the first sensor 300. Then, the determination unit 140 determines whether or not the temperature of the first sensor 300 is within a predetermined temperature range (example: a proper operating temperature range of the first sensor 300). The proper operating temperature range of the first sensor 300 is previously determined in a design stage of the first sensor 300, based on a characteristic of each member constituting the first sensor 300, or the like. Further, information about the predetermined temperature range is previously stored in the memory 206, the storage device 208, or the like. When the temperature of the first sensor 300 is not within the predetermined temperature range, the determination unit 140 may determine the sensing result by the first sensor 300 at this time as data not used for degradation determination of the first sensor 300. Consequently, an erroneous determination about whether or not performance of the first sensor 300 is degraded can be suppressed. Further, the temperature sensor may be provided in the neighborhood of the first sensor 300. For example, the "neighborhood" in this case refers to a range in which a distance between the first sensor and the temperature sensor is within 5 millimeters.

Further, as another example, when history data include information indicating the weather or a time at sensing, the determination unit 140 may be configured to be able to sort out data used for statistical processing, based on the information. Specifically, the determination unit 140 may estimate a degradation state of the first sensor 300 by sorting out a sensing result for "the nighttime" out of sensing results included in history data, based on information indicating the weather, and comparing the sensing result with reference performance data test-measured in an environment assuming the nighttime. Consequently, a degradation state of the first sensor 300 can be estimated with data less affected by a disturbance such as the sunlight. Further, the determination unit 140 may estimate a degradation state of the first sensor 300 by sorting out a sensing result for "cloudiness in the daytime" out of sensing results included in history data, based on information indicating the weather and a time, and comparing the sensing result with reference performance data test-measured in an environment assuming "cloudiness in the daytime." Further, the determination unit 140 may determine a final degradation state of the first sensor 300 by performing statistical processing on the thus sorted out, estimated degradation states of the first sensor 300. Further, the determination unit 140 may execute statistical processing after sorting sensing results included in history data into a sensing result for "the daytime" and a sensing result for "the nighttime", based on information indicating a time, and correcting each sensing result by use of data indicating a difference between sensing results in the daytime and in the nighttime. In this case, the data indicating a difference between sensing results in the daytime and in the nighttime maybe created based on each of test measurement results in the daytime and in the nighttime. Similar processing may be performed for the weather.

Further, as another example, the determination unit 140 may specify data indicating performance degradation caused by an external environment in history data of sensing results of the first sensor 300, by use of a sensing result of the same object by a sensor equipped on another vehicle, and exclude such data from data used for statistical processing. For example, the determination unit 140 may specify data indicating performance degradation caused by an external environment and exclude the data from data used for statistical processing as described below. First, with respect to a sensing result of a certain specified object (candidate data for determining a degradation state) in history data of sensing results of the first sensor 300, the determination unit 140 collects a sensing result of the same object by a sensor on another vehicle measured at a time relatively close to (for example, of the order of tens of minutes) a time when the first sensor 300 performs sensing on the specified object. Then, the determination unit 140 calculates a difference (performance degradation) between the collected sensing result by the sensor on the other vehicle and reference performance data. When sensing results for which performance degradation greater than or equal to a reference is calculated occur by a certain ratio or greater out of the collected sensing results by the sensor on the other vehicle, a sensing result acquired at a relatively close timing from the sensing results is estimated to be similarly affected by the external environment and may not be suited as data for determining a degradation state of the first sensor 300. Accordingly, when sensing results for which performance degradation greater than or equal to the reference is calculated occur by the certain ratio or greater, the determination unit 140 excludes the aforementioned candidate data for determining a degradation state.

Further, the determination unit 140 may select a frequently detected specified object from a travel history, and a sensing history of specified objects, and determine degraded performance of the first sensor 300, based on statistical data of sensing results of the selected specified object. Thus, by narrowing down data used for performance determination of the first sensor 300 to data of a frequently detected specified object, an effect of a difference in a characteristic of each specified object (such as a material of a specified object and an environment of an installation location) on a performance determination result can be reduced, and a degradation state of the first sensor 300 can be more precisely determined.

Further, as another example, the determination unit 140 may acquire, as reference performance data, data generated based on a sensing history of a specified object and a traveling state of the vehicle when sensing is performed on the specified object. For example, the traveling state of the vehicle includes a distance to the specified object, a direction of the specified object relative to a traveling direction of the vehicle, and a vehicle speed at the time of sensing. Further, the reference performance data is history data associating a sensing result with traveling state information indicating a traveling state of the vehicle when the sensing result is acquired. The determination unit 140 determines performance of the first sensor 300 by using a traveling state having a distance, a direction, and a speed matching a sensing result of the first sensor 300 or a traveling state being associated with a distance, a direction, and a speed each having a value within a predetermined range from the sensing result. An example of a specific processing flow will be described below by use of diagrams.

Figure 11:
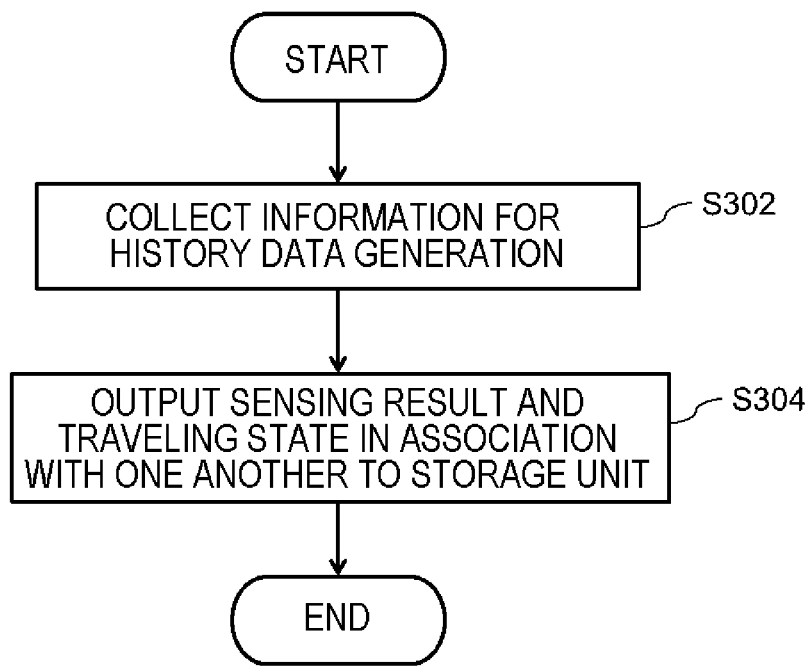
FIG. 11 is a flowchart illustrating a flow of processing of generating history data (reference performance data).

FIG. 11 is a flowchart illustrating a flow of processing of generating history data (reference performance data). While an example of the first vehicle 500 equipped with the control device 100 executing the process in FIG. 11 is described here, the process illustrated in FIG. 11 may be executed by another vehicle not equipped with the control device 100.

First, by the first vehicle 500 going on a test drive on a route around a target specified object, information for history data generation is collected by the control device 100 (S302). Specifically, the control device 100 may acquire a sensing result (such as data indicating a distance to the specified object, data indicating a direction in which the specified object is positioned relative to a traveling direction of the first vehicle 500, and a signal-to-noise ratio or a signal strength of a signal) of the first sensor 300. Further, the control device 100 may acquire traveling state information (such as information acquired from a signal controlling steering, an accelerator pedal, and a brake pedal, and a signal related to a vehicle speed) of the first vehicle 500 through a CAN or the like. Then, the control device 100 outputs (stores) history data (example: FIG. 12) associating the acquired traveling state information with the acquired sensing result to (into) a storage unit as reference performance data (S304). FIG. 12 is a diagram illustrating an example of history data (reference performance data). For example, the control device 100 stores the history data as illustrated in FIG. 12 into the storage device 208. The control device 100 may output the history data as illustrated in FIG. 12 to an external server device (unillustrated) positioned outside the first vehicle 500, or the like. By use of thus generated history data, for example, processing of determining performance of a sensor as illustrated in FIG. 13 is executed.

Figure 13:
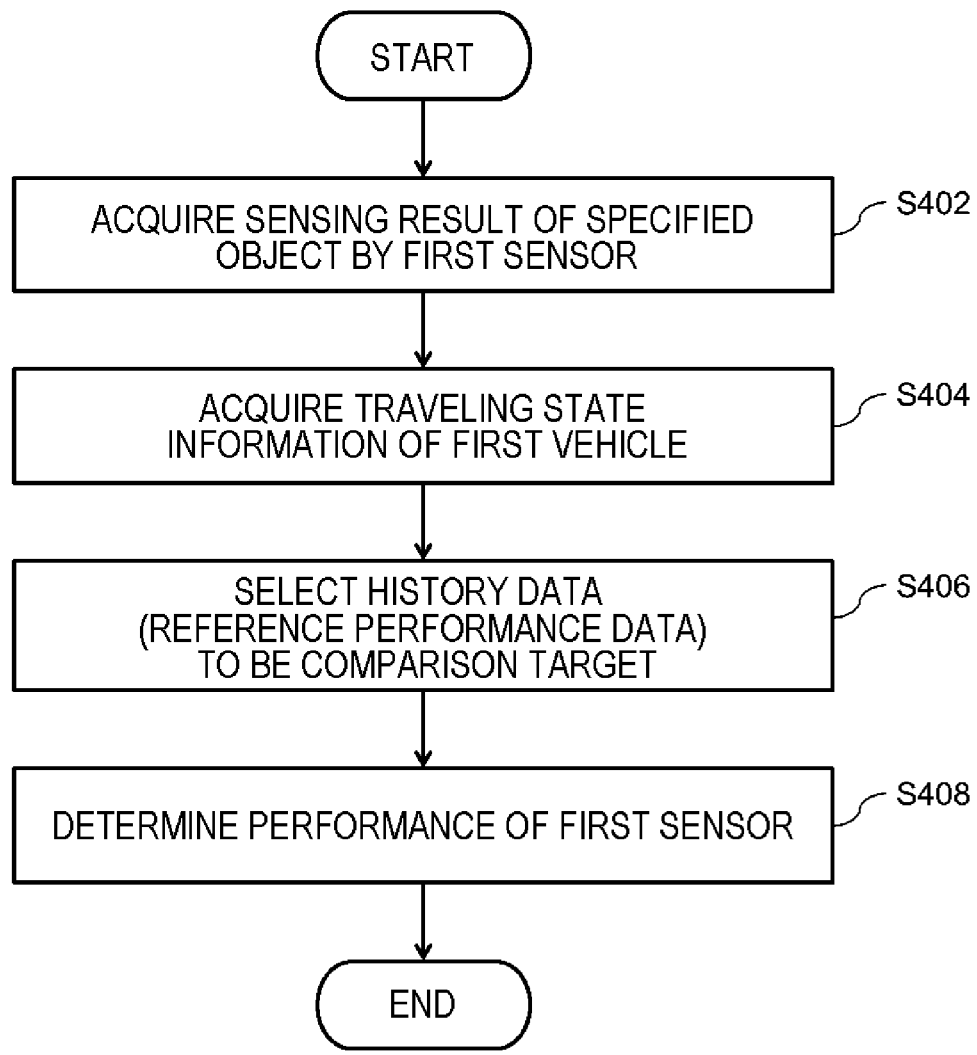
FIG. 13 is a flowchart illustrating a flow of processing of determining performance of a first sensor by use of history data.

FIG. 13 is a flowchart illustrating a flow of processing of determining performance of the first sensor 300 by use of history data.

First, the determination unit 140 acquires a sensing result of a specified object by the first sensor 300 (S402). Further, when acquiring the sensing result by the first sensor 300 in the processing in S402, the determination unit 140 acquires traveling state information of the vehicle (first vehicle 500) at this time through the CAN or the like (S404). Then, from the history data (reference performance data) as illustrated in FIG. 12, the determination unit 140 selects history data (reference performance data) based on an observation condition (such as a distance from the vehicle to the specified object, a direction in which the specified object is positioned relative to a traveling direction of the vehicle, and a traveling speed of the vehicle) equivalent or similar to an observation condition of the first sensor 300 when the sensing result acquired in S402 is acquired (S406). For example, by calculating a degree of similarity based on a distance from the vehicle to the specified object, a direction in which the specified object is positioned relative to a traveling direction of the vehicle, and a traveling speed of the vehicle, the determination unit 140 can determine history data (reference performance data) based on a similar observation condition. Then, by comparing the selected history data (reference performance data) with the sensing result acquired in the processing in S402, the determination unit 140 determines performance of the first sensor 300 (S408). With a configuration making a comparison with reference performance data based on a similar observation condition, performance degradation of the first sensor 300 can be more precisely determined.

Further, as another example, in order to acquire a more precise sensing result with respect to a specified object, traveling of a vehicle may be controlled as the vehicle approaches the specified object. When a position indicated by positional information of the first vehicle 500 acquired by the detection unit 130 is within a predetermined range from a position of the specified object, an unillustrated vehicle control unit controls traveling of the first vehicle in such a way that the first sensor 300 can more precisely detect the specified object. For example, traveling of the first vehicle allowing more precise detection of the specified object refers to traveling on a lane facing the specified object, traveling at a speed less than or equal to a predetermined value, and traveling at a constant speed. Further, instead of controlling traveling of the vehicle, the vehicle control unit may output information instructing a lane to travel on to a driver.

Further, while a plurality of steps (processing) are described in a sequential order in a plurality of flowcharts used in the description above, an execution order of the steps executed in each embodiment is not limited to the described order. An order of steps described in each embodiment may be changed in a range without hindrance in contents. Further, the respective aforementioned embodiments may be combined in a range in which the contents do not conflict with each other.

Without being particularly limited, for example, a part or the whole of the aforementioned embodiments may also be described as the following supplementary notes.

1. A control device including:
   an acquisition unit configured to acquire, from a first sensor for detecting an object proximate to a first vehicle, a sensing result of a specified object being an object for performance measurement of the first sensor; and
   a determination unit configured to determine performance of the first sensor by use of a sensing result of the specified object acquired by the acquisition unit.

2. A control method executed by a computer, the control method including:
   acquiring, from a first sensor for detecting an object proximate to a first vehicle, result of the specified acquired object being an object for performance measurement of the first sensor; and
   determining performance of the first sensor by use of a sensing result of the specified object acquired.

3. A program for causing a computer to function as:
   a unit configured to acquire, from a first sensor for detecting an object proximate to a first vehicle, a sensing result of a specified object being an object for performance measurement of the first sensor; and
   a unit configured to determine performance of the first sensor by use of a sensing result of the specified object acquired by the acquisition unit.

This application claims priority based on Japanese Patent Application No. 2017-099151 filed on May 18, 2017, the disclosure of which is hereby incorporated by reference thereto in its entirety.

The invention claimed is:

1. A control device comprising:
   a first acquisition unit configured to acquire a sensing result being a result of detecting an object around a first vehicle from a first sensor equipped on the first vehicle;
   a second acquisition unit configured to acquire positional information defined for each specified object being an object for performance measurement of the first sensor;
   a detection unit configured to detect at least one target specified object existing within a reference distance from the first vehicle, by use of the positional information defined for each specified object and positional information of the first vehicle;
   a determination unit configured to determine a degradation state of the first sensor by use of the sensing result of the at least one target specified object by the first sensor; and
   an alarm output unit configured to compare a first degradation state of the first sensor at a first time point and a second degradation state of the first sensor at a second time point prior to the first time point, and output, responsive to determining that a difference in amounts of degradation between the first degradation state and the second degradation state is greater than or equal to a predetermined threshold value, an alarm about the first sensor,
   wherein the first time point and the second time point are real times for measurement of the first sensor while the first vehicle is traveling.

2. The control device according to claim 1, wherein the positional information of the specified object is associated with map information.

3. The control device according to claim 1, wherein the specified object is an installation installed on a road or a marking on a road.

4. The control device according to claim 1, wherein the determination unit determines the degradation state of the first sensor, based on a result of comparing the sensing result of the at least one target specified object with reference performance data associated with the at least one target specified object.

5. The control device according to claim 4, wherein the reference performance data for each specified object is determined and preset based on a test sensing result of the specified object by the first sensor in a predetermined external environment.

6. The control device according to claim 4, wherein the reference performance data for each specified object include a traveling state of the first vehicle at a time of detection of the specified object around the first vehicle by the first sensor, in a predetermined external environment.

7. The control device according to claim 1, wherein the detection unit excludes the specified object not satisfying a predetermined criterion from a detection target, by use of history data of a sensing result of the specified object.

8. The control device according to claim 1, wherein the detection unit sorts out the specified object to be a detection target, by use of information indicating an inclination of the specified object.

9. The control device according to claim 1, further comprising a control unit configured to control a control parameter in automated driving of the first vehicle, by use of the degradation state of the first sensor determined by the determination unit.

10. The control device according to claim 1, wherein the determination unit determines the degradation state of the first sensor by use of the sensing result of the at least one target specified object at each of one or a plurality of distances defined within the reference distance.

11. The control device according to claim 1, wherein the determination unit determines the degradation state of the first sensor by use of temperature information indicating a temperature of the first sensor.

12. The control device according to claim 1, wherein the determination unit generates statistical data based on multiple sensing results of the at least one target specified object, and estimates the degradation state of the first sensor based on the statistical data.

13. The control device according to claim 12, wherein the determination unit selects sensing results of the at least one target specified object being used, for generating the statistical data based on weather information or time information associated with each of the multiple sensing results.

14. The control device according to claim 12, wherein the determination unit sorts out the multiple sensing results of the at least one target specified object, by use of a history of a second sensing result of a same specified object by a second sensor equipped on a second vehicle different from the first vehicle to determine sensing results being used for generating the statistical data.

15. The control device according to claim 1, wherein the determination unit calculates a number of times each of specified objects is detected based on a travel history of the first vehicle and a sensing history of specified objects, selects a specified object based on the calculated number of times for each of specified objects, and determines the degradation state of the first sensor based on statistical data of sensing results of the selected specified object.

16. The control device according to claim 1, further comprising a vehicle control unit that controls traveling of the first vehicle when a position indicated by the positional information of the first vehicle is within a predetermined range from a position indicated by the positional information of the specified object.

17. A scanning system comprising:
a first sensor configured to detect an object positioned around a first vehicle; and
a control device comprising:
a first acquisition unit configured to acquire a sensing result being a result of detecting an object around the first vehicle from the first sensor equipped on the first vehicle;
a second acquisition unit configured to acquire positional information defined for each specified object being an object for performance measurement of the first sensor;
a detection unit configured to detect at least one target specified object existing within a reference distance from the first vehicle, by use of the positional information defined for each specified object and positional information of the first vehicle;
a determination unit configured to determine a degradation state of the first sensor by use of the sensing result of the at least one target specified object by the first sensor; and
an alarm output unit configured to compare a first degradation state of the first sensor at a first time point and a second degradation state of the first sensor at a second time point prior to the first time point, and output, responsive to determining that a difference in amounts of degradation between the first degradation state and the second degradation state is greater than or equal to a predetermined threshold value, an alarm about the first sensor,
wherein the first time point and the second time point are real times for measurement of the first sensor while the first vehicle is traveling.

18. The scanning system according to claim 17, wherein the first sensor measures a distance and a direction from the first vehicle to the object by use of light.

19. A control method executed by a computer, the control method comprising:
acquiring a sensing result being a result of detecting an object around a first vehicle from a first sensor equipped on the first vehicle;
acquiring positional information defined for each specified object being an object for performance measurement of the first sensor;
detecting at least one target specified object existing within a reference distance from the first vehicle, by use of the positional information defined for each specified object and positional information of the first vehicle;
determining a degradation state of the first sensor by use of the sensing result of the at least one target specified object by the first sensor;
comparing a first degradation state of the first sensor at a first time point and a second degradation state of the first sensor at a second time point prior to the first time point; and
outputting, responsive to determining that a difference in amounts of degradation between the first degradation state and the second degradation state is greater than or equal to a predetermined threshold value, an alarm about the first sensor,
wherein the first time point and the second time point are real times for measurement of the first sensor while the first vehicle is traveling.

20. A non-transitory computer readable medium storing a program for causing a computer to execute a method, the method comprising:
acquiring a sensing result being a result of detecting an object around a first vehicle from a first sensor equipped on the first vehicle;
acquiring positional information defined for each specified object being an object for performance measurement of the first sensor;
detecting at least one target specified object existing within a reference distance from the first vehicle, by use of the positional information defined for each specified object and positional information of the first vehicle;
determining a degradation state of the first sensor by use of the sensing result of the at least one target specified object by the first sensor;
comparing a first degradation state of the first sensor at a first time point and a second degradation state of the first sensor at a second time point prior to the first time point; and
outputting, responsive to determining that a difference in amounts of degradation between the first degradation state and the second degradation state is greater than or equal to a predetermined threshold value, an alarm about the first sensor,
wherein the first time point and the second time point are real times for measurement of the first sensor while the first vehicle is traveling.

* * * * *